United States Patent
Rao et al.

(10) Patent No.: US 7,809,366 B2
(45) Date of Patent: Oct. 5, 2010

(54) MOBILE DEVICE CLIENT

(75) Inventors: Bindu Rama Rao, Laguna Niguel, CA (US); Robert C. Daley, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1088 days.

(21) Appl. No.: 11/385,162

(22) Filed: Mar. 21, 2006

(65) Prior Publication Data

US 2006/0236325 A1 Oct. 19, 2006

Related U.S. Application Data

(60) Provisional application No. 60/664,249, filed on Mar. 21, 2005.

(51) Int. Cl.
*H04M 3/00* (2006.01)
(52) U.S. Cl. .................. 455/419; 455/418; 455/424; 455/425; 709/219; 709/215
(58) Field of Classification Search ......... 455/418–420, 455/456.1, 550.1, 561, 424; 709/219, 315
See application file for complete search history.

(56) References Cited

U.S. PATENT DOCUMENTS 7,526,563 B2 * 4/2009 Ingimundarson et al. .... 709/230

| 2005/0136942 | A1 * | 6/2005 | Timiri et al. ............. 455/456.1 |
| 2005/0251848 | A1 * | 11/2005 | Al-Janabi .................... 725/135 |
| 2006/0190608 | A1 * | 8/2006 | Sahinoja et al. ............. 709/227 |
| 2006/0203722 | A1 * | 9/2006 | Oommen .................... 370/229 |

FOREIGN PATENT DOCUMENTS

| EP | 1515571 A2 | 3/2005 |
| WO | 2005004395 A1 | 1/2005 |

* cited by examiner

*Primary Examiner*—CongVan Tran

(57) ABSTRACT

A device client that supports customer care and distribution of update packages to electronic devices makes it possible to efficiently manage and update firmware and software in electronic devices. A terminal management/device management server employs extensions to an industry standard device management protocol to update configuration information, to provision the electronic device, and to manage the electronic device, for example. The electronic device may receive update packages, and update agent(s) in the electronic device may update the firmware and/or software of the electronic device. A diagnostic client in the electronic device facilitates remote diagnosis and a traps client facilitates setting traps and retrieving collected information. A terminal management server may remotely invoke control actions within the electronic device using management objects not supported by the industry standard device management protocol. A user of the electronic device may use a self-care portal to administer self-care and to conduct diagnostics. A subsequent customer-care call may use such information collected during self-care.

19 Claims, 3 Drawing Sheets

MOBILE DEVICE CLIENT

RELATED APPLICATIONS

The present application makes reference to, claims priority to, and claims benefit of U.S. Provisional Patent Application Ser. No. 60/664,249 entitled "DEVICE CLIENT SPECIFICATION", filed Mar. 21, 2005, the complete subject matter of which is hereby incorporated herein by reference, in its entirety.

The present application makes reference to PCT Application with publication number WO/02/41147A1, PCT number PCT/US01/44034, filed Nov. 19, 2001, and to U.S. Provisional Patent Application Ser. No. 60/249,606, filed Nov. 17, 2000, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. If firmware or firmware components are to be changed in electronic devices, it is often very tricky to update the firmware components.

It is often difficult to determine what is wrong with a device when a problem is encountered. Quite often, a customer care representative for an operator does not have answers to a customer's problem and is not able to fix it. Determination of problems with a customer's mobile device is a big problem for operators. Answering customer care calls is quite expensive. Especially so if at the end of such a call, the customer care representative is unable to determine what is wrong with the device.

Different devices have different set of resources, different sets of parameters, etc. Managing mobile devices in a heterogeneous network is a huge problem. Figuring out what parameters need to be set is also a problem.

Customer care centers get numerous calls for support from customers. They have very few means to determine what is wrong with a device. The Customer Care Representative (CCR) often asks questions of a customer, but they do not get proper answers. Customers often do not know what is wrong with their device. Thus, configuration changes that can fix a problem cannot be easily determined. Again, firmware updates that can fix the problem cannot be identified.

Quite often, even when a problem is diagnosed, a solution may not be available. Thus, customers who call to report a problem go away without having solved it.

If an operator needs to update millions of phones to fix a known bug, it will be very expensive and take a lot of resources. There is no easy way to conduct mass updates of millions of devices, such as mobile handsets.

The Open Mobile Alliance (OMA) device management (DM) protocol is emerging as the principal protocol for managing handsets over the air (OTA). Unlike earlier "push" based protocols, the OMA DM protocol allows a rich dialog for the exchange of information and commands between an OMA DM-capable handset and an authorized, OMA DM-capable management server. The OMA Download (DL) OTA protocol is still the preferred protocol for performing the download of application and firmware content, but the overall management of such operations can now be initiated and managed using the OMA DM protocol.

OMA DM protocol management operations may be controlled through the use of management objects, abstracted as a hierarchical tree structure. The management tree provides a common language between the client (an electronic device such as a cellular phone, pager, or personal digital assistant, for example) and the server (e.g., a device management server) for information exchange, expressed in terms of management objects. Each management object represents one or more data values that can be exchanged between the client (e.g., the electronic device) and the server (e.g., a DM server) using the OMA DM protocol. In addition, each management object may also have its own unique "behavior" which can be triggered by any OMA DM command deemed suitable for that purpose.

Unfortunately, OMA DM has yet to define OMA DM objects for many of the values and operations required to achieve the level of comprehensive device management presented in this requirements specification.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method supporting a device client in an electronic device, substantially as shown in and/or described in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

Aspects of the present invention relate to the configuration, management and updating of configuration parameters, firmware and/or software in a mobile electronic device. More specifically, aspects of the present invention relate to a device management client in a mobile device such as for example, a cellular phone, pager, a personal digital assistant, and personal computer that supports the management of device configuration parameters and software/firmware. Although the present application refers frequently to an electronic device in terms of a cellular phone, a pager, a personal digital assistant, or a personal computer this does not represent a specific limitation of the present invention. A mobile electronic device for the purposes of the present application may comprise a wide variety of electronic devices having updatable code and/or configuration parameters that may be managed via a wired or wireless communications link using a device client resident in the electronic device. Although the following makes reference to the Open Mobile Alliance (OMA) protocols and specifications, representative embodiments the present invention have may be applied in combination with other industry standard protocols. Each of the Open Mobile Alliance (OMA) specifications listed herein is hereby incorporated herein by reference, in its entirety.

Figure 1:
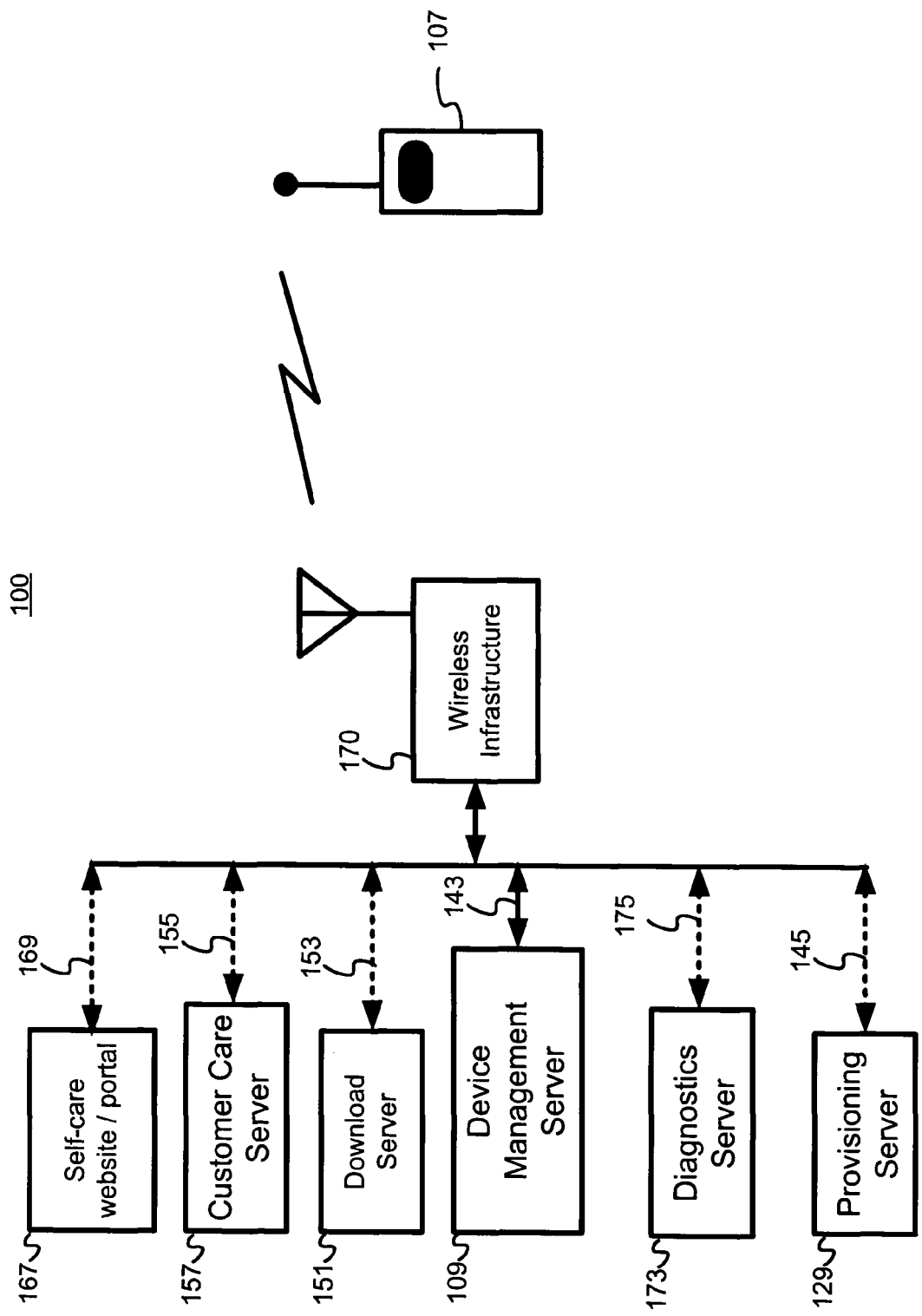
FIG. 1 shows a communication network supporting management of an electronic device served via a wireless infrastructure, in which a representative embodiment of the present invention may be practiced.

FIG. 1 shows a communication network 100 supporting management of an electronic device 107 served via a wireless infrastructure 170, in which a representative embodiment of the present invention may be practiced. The communication network 100 comprises a customer care server 157 communicatively coupled to the wireless infrastructure 170 via a communication path 155. The customer care server 157 may support the activities of a customer care representative (not shown) using, for example, a dedicated terminal device, or a personal computer having appropriate application software. The communication path 155 may comprise a dedicated wired or wireless communication link such as, for example, an intranet, the Internet, a wired or wireless local area network, a packet network, or any other suitable form of communication link. The communication network 100 may also comprise a self-care website/portal 167 communicatively coupled to the wireless infrastructure 170. The self-care website/portal 167 may permit a subscriber having electronic device 107 to diagnose, provision, and update the electronic device 107 via, for example, a wired or wireless communication path 169 that may include, for example, any of the communication means described above with respect to communication path 155.

The communication network 100 also comprises a provisioning server 129, that may also be referred to herein as a "broadcast server", and a device management (DM) server 109 that may support, for example, an Open Mobile Alliance (OMA) device management (DM) protocol, or a proprietary protocol. The communication network 100 also comprises a download server 151 for downloading update packages to the electronic device 107. In a representative embodiment of the present invention, an update package may, among other things, comprise a set of instructions executable by an update agent (not shown) in the electronic device 107 to convert or transform an existing version of software and/or firmware code to an updated version.

As shown in the illustration of FIG. 1, the self-care website/portal 167, the customer care server 157, the provisioning server 129, a DM server 109, a diagnostics server 173 and the download server 151 may be communicatively coupled via respective communication paths 169, 155, 145, 143, 175, and 153 to the wireless infrastructure 170. Although shown as separate entities, the self-care website/portal 167, the customer care server 157, the provisioning server 129, the DM server 109, the diagnostics server 173 and the download server 151 may reside on a single server, or on multiple servers co-located or separately located, depending upon anticipated load, economics, server capability, etc. The communication paths 169, 145, 143, 175 and 153 may comprise any of the communication links described above with respect to the communication path 155. The wireless infrastructure 170, in a representative embodiment of the present invention may comprise, for example, a cellular network, a paging network, a wireless local and/or wide area network, or other suitable wireless communication network. Although the wireless infrastructure 170 is shown as a single entity having a single antenna location, this does not represent a specific limitation of the present invention. A representative embodiment of the present invention may comprise a greater number of antenna locations including those belonging to separate services providers, without departing from the scope of the present invention.

Figure 2:
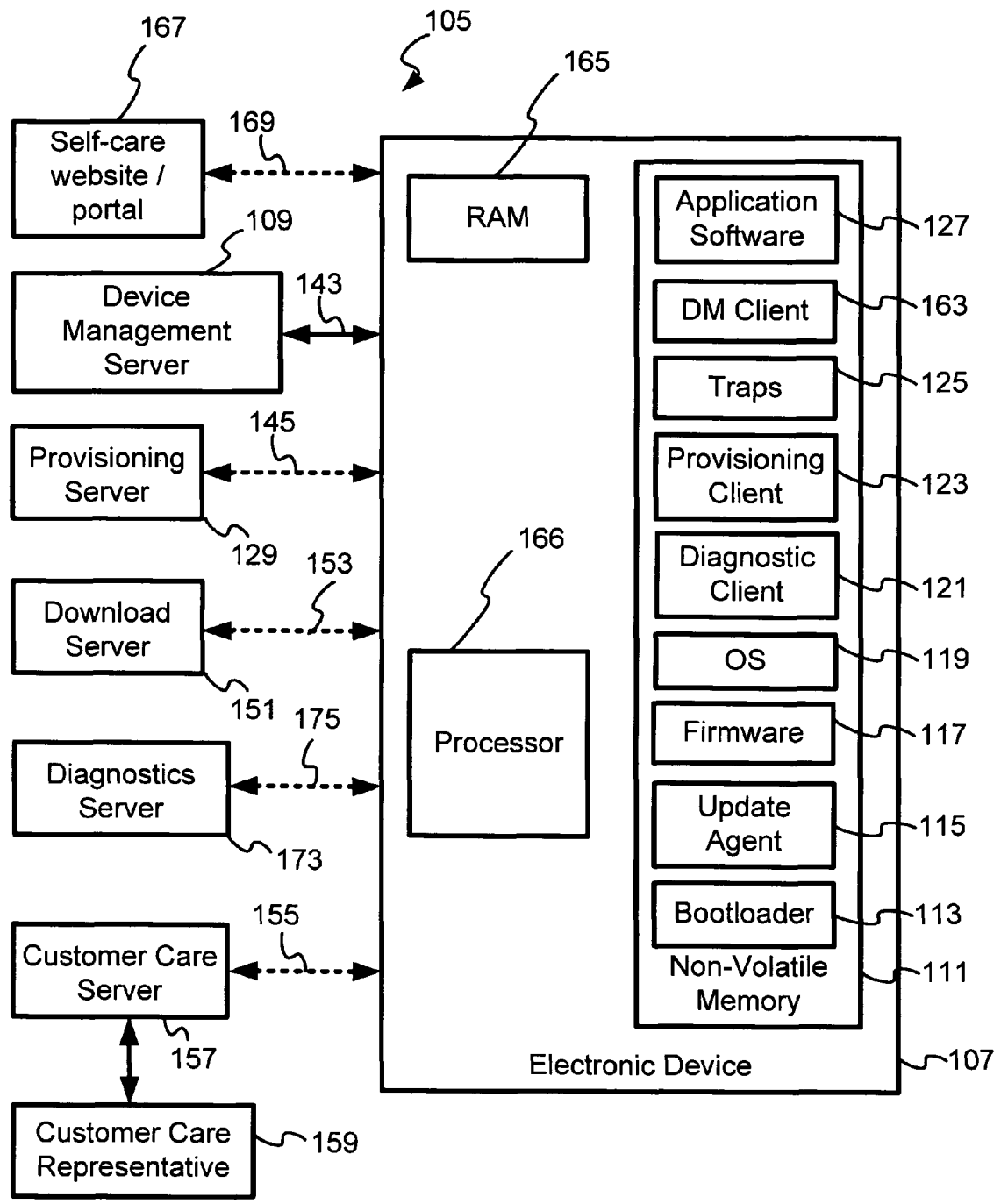
FIG. 2 is a perspective block diagram of an exemplary network that is capable of diagnosing problems within a electronic device that may correspond to, for example, the electronic device of FIG. 1, and of disseminating solutions based on a dissemination policy, in accordance with a representative embodiment of the present invention.

FIG. 2 is a perspective block diagram of an exemplary network 105 that is capable of diagnosing problems within a electronic device 107 that may correspond to, for example, the electronic device 107 of FIG. 1, and of disseminating solutions based on a dissemination policy, in accordance with a representative embodiment of the present invention. The network 105 may enable mass distribution of firmware and/or software updates to fix problems that have been diagnosed within electronic devices such as the electronic device 107 of FIG. 2, for example. As illustrated in FIG. 2, the network 105 comprises a self-care website/portal 167, a device management (DM) server 109, a diagnostics server 173, a customer care server 157, a download server 151, and a provisioning server 129, that may correspond to, for example, the self-care website/portal 167, DM server 109, diagnostics server 173, customer care server 157, download server 151 and provisioning server 129 of FIG. 1. Although not shown in FIG. 2, the self-care website/portal 167, device management (DM) server 109, diagnostics server 173, customer care server 157, download server 151, and provisioning server 129 may be communicatively coupled to enable the self-care website/portal 167, device management (DM) server 109, diagnostics server 173, customer care server 157, download server 151, and provisioning server 129 to cooperate in providing management/diagnostic services and functions for the electronic device 107. The electronic device 107 may comprise any of a number of different portable/handheld/mobile electronic devices such as, for example, a cellular phone, a personal digital assistant, and a pager, to name only a few. In a representative embodiment of the present invention, the electronic device 107 may include non-volatile memory 111 that may, for example, comprise NAND or NOR flash memory, battery-backed memory, electrically programmable read-only memory (EPROM), or various other suitable forms of non-volatile memory. The non-volatile memory 111 of the electronic device 107 shown in FIG. 2 comprises a number of firmware/software components including application software 127, a device management (DM) client 163, a traps client 125, a provisioning client 123, a diagnostic client 121, an operating system (O/S) 119, firmware 117, an update agent 115, and a boot loader 113. The electronic device 107 also comprises a random access memory 165.

In a representative embodiment of the present invention, the electronic device 107 may be capable of updating portions of the non-volatile memory 111 in the electronic device 107 such as, for example, the application software 127, operating system (OS) 119, or firmware 117, by employing an update package (not shown) delivered by, for example, the download server 151 via communication path 153. An update package used for updating the electronic device 107 may be produced by a generator (not shown), and may comprise a set of instructions executable by the electronic device 107 to convert/ transform an existing code version to an updated code version in the memory of the electronic device 107. Additional details of the generation and application of update packages may be found in the PCT Application with publication number WO/02/41147 A1, PCT number PCT/US01/44034, filed Nov. 19, 2001, and in U.S. Provisional Patent Application Ser. No. 60/249,606, filed Nov. 17, 2000, the complete subject matter of each of which is hereby incorporated herein by reference, in its entirety. As described above with respect to FIG. 1, the communication path 153 may comprise wired or wireless communication links including, for example, packet networks, circuit switched networks, cellular or paging networks, local or wide area networks, and other suitable forms of communication networks.

In a representative embodiment of the present invention, the electronic device 107 may receive provisioning information from the customer care server 157 or the provisioning server 129, to correct configuration problems or to reconfigure software and hardware. The electronic device 107 may apply updates using one or more update agents 115 that are each capable of processing update packages or portions/subsets thereof. The electronic device 107 may receive update packages, and update the memory of the electronic device 107 using the update agent(s) 115. The update agent(s) 115 may be capable of updating any of the firmware and/or software in the electronic device 107 including, for example, the diagnostic client 121 that facilitates remote diagnosis, and a traps client 125 that facilitates setting traps and retrieving collected information.

As shown in FIG. 2, the electronic device 107 may comprise a DM client 163 that is capable of interacting with, for example, the DM server 109, the provisioning client 123, the diagnostic client 121 and the traps client 125. In a representative embodiment of the present invention, the DM client 163 may receive device management commands from, for example, the DM server 109, and may implement the received DM commands on the electronic device 107. The DM commands may, for example, comprise elements of the OMA Device Management (DM) protocol being developed under the auspices of the Open Mobile Alliance Ltd. Such protocol elements may support the management (e.g., creation, setting, updating, retrieving, and deletion) of information stored as management objects in a device management structure (e.g., a device management (DM) tree) in the memory of the electronic device 107.

In a representative embodiment of the present invention, a download server such as, for example, the download server 151 of FIG. 2 may download firmware and/or software updates (e.g., within update packages) to the electronic device 107 via the communication path 153, for later application to the memory of the electronic device 107. A customer care server 157 may facilitate access to information (e.g., code, parameters and data) contained within the electronic device 107, by customer care representative (CCR) 159. Although only one customer care representative 159 is shown in FIG. 2, a greater number of customer care representatives may be supported by the customer care server 157, without departing from the scope of the present invention.

A representative embodiment of the present invention may comprise a provisioning server 129 that may be used to facilitate communication of provisioning information (e.g., service-related parameters, device-parameters, user preferences), using, for example, an over the air (OTA) delivery mechanism via the communication path 145. The communication path 145 may, for example, comprise any suitable wired or wireless communication link including, for example, those described above with respect to communication path 153.

Although the communications paths 143, 145, 153, 155, 169 are shown as being separate, this is not a specific limitation of the present invention. The functionality of any of the self-care website/portal 167, device management (DM) server 109, customer care server 157, download server 151, and provisioning server 129 may be combined on a single or cluster of servers, and may be communicatively coupled to any of the other of the self-care website/portal 167, device management (DM) server 109, customer care server 157, download server 151, and provisioning server 129.

When a CCR such as the CCR 159 wishes to diagnose a problem with an electronic device such as the electronic device 107, for example, the CCR 159 may retrieve various configuration values, parameters, etc. from the electronic device 107 one at a time. In a representative embodiment of the present invention, the CCR 159 may instead elect to retrieve a device profile comprising a larger set of information from the electronic device 107.

In a representative embodiment of the present invention, a customer care representative such as, for example, customer care representative 159 of FIG. 2 may, with the help of the customer care server 157, initiate the collection of quality-of-service (QoS) related parameters from the electronic device 107, when the user of the electronic device 107 calls the customer care representative 159 to report a problem with the electronic device 107. The customer care server 157 may facilitate collection of, for example, fault incidence and repair information, fault incidence information, time taken to clear a fault, and accumulated down time of a device or service, to name only a few such QoS parameters. The customer care server 157 may also facilitate collection from the electronic device 107 of information related to, for example, network performance, call success rate within the network, service access delay information, call drop rate, and percentage of connections with good voice quality, to name only a few network-related QoS parameters.

In one representative embodiment of the present invention, the user/subscriber may be provided with the ability to go to a self-care website/portal such as, for example, the self-care website/portal 167 of FIG. 2, to update a device profile, to provide subscriber information, and to access details of downloaded/downloadable software, for example. All such information provided by a user, or retrieved from an electronic device (e.g., electronic device 107 of FIG. 2) during a self-care portal interaction, may subsequently be accessed by a customer care server such as, for example, the customer care system 157. In a representative embodiment of the present invention, whenever a user contacts a customer care representative (e.g., CCR 159 of FIG. 2) and the customer care system 157 is able to interact with the electronic device of the caller, the customer care system 157 may automatically retrieve data previously entered and collected during a self-care activity at a self-care website/portal such as the self-care website/portal 167 shown in FIG. 2.

In a network in accordance with a representative embodiment of the present invention, the user of an electronic device such as the electronic device 107, for example, may employ a self-care website/portal like the self-care website/portal 169 to administer self-care and conduct diagnostics of the electronic device 107. During a subsequent user call to a customer care representative, the customer care representative may use such information collected during user self-care activities, when interacting with the user of the electronic device 107.

Aspects of the present invention relate to device management of electronic devices such as cellular phone, pagers, and personal digital assistants, for example, and more specifically, device management that permits such electronic devices to be profiled and managed using device management and download protocols. Certain aspects of the present invention may involve the use of client provisioning protocols that may be used for electronic devices that have not been pre-provisioned to connect with an electronic device that is capable of communication with a device management or download server. A representative embodiment of the present invention may support handset control protocol elements used for terminal management operations related such as, for example, "reset device", "lock/unlock device", "delete application", or "wipe device", to name only a few. A representative embodiment of the present invention may employ a terminal management server that communicates commands to an electronic device such as, for example, the electronic device 107 of FIG. 2. The electronic device may comprise an Open Mobile Alliance (OMA) device management (DM) compliant device client (e.g., DM client 163 of FIG. 2) that processes such commands and performs operations within the electronic device. A representative embodiment of the present invention may employ extensions to the OMA DM protocol that support access (e.g., retrieval, creation, deletion, and modification) of management objects for hardware-related information (e.g., electronic components, circuitry, and capabilities) of the electronic device, for example. Such management objects may include, for example, the original equipment manufacturer (OEM), the software platform used, the processor used, a battery level, whether or not the electronic device is currently connected to AC power, and information about memory in the electronic device. In a representative embodiment of the present invention, a device client such as, for example, the DM client 163 of FIG. 2 may incorporate functionality that compensates for a lack of sufficient information about an electronic device in the ./DevInfo and ./DevDetail management objects of the industry standard OMA DM protocol.

A representative embodiment of the present invention may support initialization of an electronic device that is able to connect to a device management server. Such a representative embodiment may support authentication, security, and data integrity functionality. A representative embodiment of the present invention may support parameter configuration and the establishment of various application settings for Internet access, bookmarks, email, MMS, PIM Sync, and other network applications. Profiling, analysis, and control functionality that allows a device management (DM) server such as the DM server 109 of FIG. 2, for example, to read, analyze, and update device, network and application information on the electronic device may be provided. In a representative embodiment of the present invention, device control operations that permit a device management server to send specific control commands to an electronic device such as, for example, the electronic device 107 that may include "lock/unlock device", "reset device", "stop application", "delete application", for example, may be supported. In addition, a representative embodiment of the present invention may support firmware update functionality that permits the firmware of an electronic device (e.g., 107 of FIG. 2) to be updated for the purpose of fixing bugs and introducing new device-side capabilities, for example. Software and general content may be downloadable, and a DM server (e.g., 109 of FIG. 2) may initiate content download via, for example, Open Mobile Alliance (OMA) device management (DM) and OMA Download (DL) over-the-air (OTA) protocols and methods.

The present application uses the abbreviations shown below in Table 1.

TABLE 1

| | |
|---|---|
| API | Application programming interface. |
| CCR | Customer Care Representative: Also referred to herein as a customer service representative (CSR). |
| CSR | Customer Service Representative: Also referred to herein as a customer care representative (CCR). |
| CSV | Comma Separated Values: A simple formatting standard for transmitting multi-value information separated by a delimiter character, typically a comma or tab character. |
| DM | Device Management |
| ESN | Electronic Serial Number: A unique device identifier for CDMA and TDMA mobile handsets. |
| FOTA | Firmware-Over-The-Air (Update). |
| FUMO | The OMA DM Firmware Update Management Object. |
| GSM | Global System for Mobile Communication. |
| IMEI | International Mobile Equipment Identity: A unique device identifier for GSM and UMTS mobile handsets. |
| IMSI | International Mobile Station Identity: An internal subscriber ID used within cellular (e.g., CDMA, GSM, UMTS) networks. |
| MDN | Mobile Directory Number: A mobile subscriber "phone number" in cellular (e.g., CDMA) networks. |
| MIN | Mobile Identification Number: An internal subscriber ID used within cellular (e.g., analog, CDMA) networks. |
| MMV | Refers to a combination of values that define a device Manufacturer, Model, and (firmware) Version. |
| MSISDN | "Mobile Station Integrated Services Digital Network", commonly used as "mobile phone number on a GSM network". |
| OMA | Open Mobile Alliance: A source of standards for Device Management, Client Provisioning, and Content Download over-the- air. |
| OMA CP | OMA Client Provisioning: A set of OMA specifications for configuring application settings over-the-air. |
| OMA DL | OMA Download OTA: A set of OMA specifications for downloading content over-the-air. |
| OMA DM | OMA Device Management: A set of OMA specifications for managing handsets over-the-air |
| OTA | Over-The-Air: Performed over a wireless link. |
| SIM | Subscriber Identity Module, a "smart card" securely storing the key (IMSI) identifying a mobile subscriber. |
| SMS | Short Message Service: A simple store and forward text messaging system. |
| SMSC | Short Message Service Center: A network entity that sends and receives SMS messages. |

A representative embodiment of the present invention may extend the OMA DM specification, and may support a number of new OMA DM management objects. For example, there are currently no OMA DM management objects defined for provisioning email settings, but there is a set of registered OMA Client Provisioning "Application Characteristics" that define standard email settings and permissible values. The email provisioning object of a representative embodiment of the present invention may be based on the relevant OMA Client Provisioning application characteristic registration documents.

A representative embodiment of the present invention may support initial device provisioning. Before an OMA DM management session can take place, an electronic device such as, for example, the electronic device 107 of FIG. 2 may need information used to contact a designated management server. The values used by an electronic device for such an OMA DM session and that may be established on the electronic device may correspond to the DMAcc and Con objects as defined in OMA DM Specification "OMA-SyncML-DM-Bootstrap-V1__1__2-20031209-A" A representative embodiment of the present invention may support the following methods for this initial device provisioning.

In a first method, initial settings may be provisioned from a smart card (subscriber identity module (SIM or USIM) card, as specified in OMA Client Provisioning Specification "OMA-WAP-ProvSC-v1_1-20021112-C". This may be a preferred method for large scale device initialization for a specific carrier or network.

If the use of smart card provisioning is infeasible for technical or logistic reasons, a representative embodiment of the present invention may support electronic devices such as the electronic device 107 of FIG. 2, that have been pre-provisioned with carrier specific initial settings by the manufacturer, prior to delivery to the carrier (also referred to herein as a service provider).

Although the two methods above are typically preferred from both a security and network performance point of view, if neither of these previous two methods are feasible for pre-provisioning OMA DM initial settings in an electronic device, a representative embodiment of the present invention may support electronic devices that have been provisioned in small volume "trial" deployments, where "bootstrapping" of initial OMA DM settings over the air (e.g., via multiple short message service (SMS) messages) is employed.

A representative embodiment of the present invention may support an electronic device (e.g., 107 of FIG. 2) that has the necessary parameters to contact a DM server using the OMA DM protocol, by ensuring that the OMA DM session is authorized, secure and reliable, using the security components defined in the OMA DM standard titled "OMA-SyncML-DMSecurity-V1_1_2-20031209-A". In a representative embodiment of the present invention, OMA DM sessions may use a secure transport such as hypertext transport protocol (HTTP) over secure sockets layer (SSL).

In a representative embodiment of the present invention, once an electronic device such as, for example, the electronic device 107 of FIG. 2 has established basic secure communication with the designated DM server (e.g., 109 of FIG. 2), all additional configuration settings for Internet access, email, MMS, IM, etc. may be configured using the OMA DM management objects discussed below. The configuration objects defined herein have been based upon registered OMA Client Provisioning "application characteristics". In this manner, employment of a representative embodiment of the present invention allows OMA CP defined applications to be provisioned over-the-air (OTA) in a standard manner with capability equal to or greater than that which would be possible using OMA Client Provisioning.

A representative embodiment of the present invention may support a set of OMA DM objects for handset profiling and analysis, that allow a management server such as, for example, the DM Server 109 of FIG. 2 to request configuration, application, firmware, device, and network information from an electronic device such as the electronic device 107 of FIG. 2, or example. By reading such information from the electronic device, a device management server such as, for example, the DM server 109 of FIG. 2 may analyze the current status of the electronic device (e.g. cellular phone, pager, personal digital assistant, personal computer, mobile handset) and may initiate action to update the settings, applications, or firmware on the electronic device 107. Such update operations may be completely automated on the DM server 109, may be controlled by a customer service representative (CSR), or may be initiated from a self care web site such as self-care website/portal 167, for example, by a subscriber.

A representative embodiment of the present invention may support a set of handset control operations using a handset control object. In this manner, a device management server such as, for example, the DM server 109 may instruct an electronic device such as the electronic device 107 of FIG. 2 to perform a number of "control" operations including, for example, "reset device", "lock/unlock device", "delete application", or "wipe device". Some of these control operations may support enterprise customers who wish to ensure that an electronic device in the hands of a ex-employee does not represent a threat to enterprise intellectual property.

A representative embodiment of the present invention may include full support for firmware update over-the-air (OTA), using a standard OMA DM FUMO object. OMA DM may be employed for initiating an update operation, OMA Download may be used to deliver firmware update package(s) to the electronic device, and final status may be reported back to a DM server such as the DM server 109 of FIG. 2 using OMA DM, for example. Note that in a representative embodiment of the present invention, the OMA Download protocol may be employed for package delivery to facilitate recovery at the point of failure, should the download be interrupted due to a loss of the data connection.

A representative embodiment of the present invention may use an OMA DM management object based upon the OMA DM Firmware Update Management Object (FUMO) object to support software/firmware and content download. In this manner, a DM server in accordance with a representative embodiment of the present invention may instruct an electronic device (e.g., 107 of FIG. 2) to initiate the download and installation of specific application or other content from an OMA Download (DL)-compliant content management server such as the DM server 109, for example. Such a management object allows a device management server in accordance with the present invention to cause a device client such as, for example, the device client 163 of FIG. 2 to both initiate the download and, upon completion, report status back to the device management server.

A representative embodiment of the present invention may comply with all mandatory elements defined in OMA DM document "OMA-SyncML-DMConReqs-V1_1_2-20030613-A".

In a representative embodiment of the present invention, initial provisioning of an electronic device such as, for example, the electronic device 107 of FIG. 2 may be involved, in order for the electronic device to have "just enough" information to be able to connect with, and authenticate itself with an associated/designated OMA DM-enabled management server. The values provisioned in the electronic device may be those values specified in the OMA DM "DMAcc" and "Con" objects, as defined in the OMA DM Standard Objects specification and the OMA DM Bootstrap specification, available from the Open Mobile Alliance.

The "DMAcc" standard object may provide, for example, client and server mutual authentication information, the server ID, address, address type, and port number. The "Con" object may define the network proxy or access point to be used to contact a device management server such as, for example, the DM server 109 of FIG. 2. The access point used to contact the device management server may be a unique access point, to allow it to be used exclusively for OMA DM management operations.

A representative embodiment of the present invention may support three methods for initial provisioning, two methods defined for "pre-provisioning" and one for over-the-air bootstrap provisioning. Electronic devices such as, for example, cellular phones, pagers, personal digital assistants, personal computers, and mobile handsets that conform to this specification may support one of the pre-provisioning methods, as well as the "bootstrap over-the-air" method previously mentioned.

In a representative embodiment of the present invention, the preferred approach to providing initial OMA DM settings in an electronic device such as, for example, the electronic device 107 of FIG. 2, may be retrieval by the electronic device of a provisioning document from a smart card (e.g., a SIM or USIM) in compliance with the OMA CP specification titled "OMA-WAP-ProvSC-v1_1-20021112-C". Such a provisioning document may be represented either as an OMA CP Application Characteristic (also known as a WAP profile), or as an OMA DM "plain profile" document. The OMA DM bootstrap specification describes and permits both profiles. An electronic device in accordance with a representative embodiment of the present invention may support the plain profile. Although OMA documents may contain text to the contrary, current discussions in the OMA DM working group indicate that the plain profile is likely to continue to be supported and perhaps even expanded in future versions of the OMA DM standard.

Upon power-up with a new SIM card, an electronic device in accordance with the present invention may retrieve bootstrap provisioning document information from an elementary file designated as the standard file for bootstrap information. If the electronic device (e.g. 107 of FIG. 2) does not already have settings associated with a specified DM server ID, the electronic device may store such settings, and may associate the settings with the specified DM server ID.

Upon successfully bootstrapping these settings into the electronic device, an electronic device in accordance with the present invention may contact an associated DM server (e.g., DM server 109 of FIG. 2) using the new settings. If the connection to the DM server succeeds but the electronic device fails to authenticate with the DM server, the settings may be discarded. If the connection to the DM server fails, the electronic device (e.g., 107 of FIG. 2) may retry connecting with the indicated DM server up to three times, after which the settings may be discarded. Once a successful connection and authentication is made with the DM server, these settings may be used in all subsequent OMA DM operations with the associated DM server.

A representative embodiment of the present invention may use a SIM card bootstrap method to support a different set of connection parameters for different carriers, or different regions within a single carrier. When a SIM card in an electronic device is changed, only the settings in the currently inserted SIM card may be used for OMA DM operations.

In a representative embodiment of the present invention, the OMA DM initial settings for contacting a single OMA DM server such as, for example, the DM server 109 of FIG. 2, may be "flashed" into memory of an electronic device such as the electronic device 107 of FIG. 2, for example. This method may be less flexible than the SIM card provisioning approach described above, and may be used when the SIM card method described above is deemed to be impractical due to SIM vendor, carrier, and electronic device (e.g., cellular phone, mobile handset) vendor logistics issues. In the case of pre-provisioning of an electronic device like electronic device 107, for example, the DMAcc and Con management object values may be flashed into memory of the electronic device 107.

In a representative embodiment of the present invention, an electronic device such as, for example, the electronic device 107 of FIG. 2 may, on power-up, check whether OMA DM settings have been changed or added since the last time the electronic device was powered up. If the stored OMA DM settings are new or modified, the electronic device may attempt to contact an associated DM server, such as the DM server 109 of FIG. 2 for example, using these settings. If the connection succeeds, but the electronic device fails to authenticate with the associated DM server, the settings in the electronic device may be deemed invalid. If the connection fails, the electronic device may retry connecting with the associated DM server up to three times, for example, after which the settings may be deemed to be invalid. Once a successful connection and authentication is made by an electronic device with an associated DM server, the settings may be used in all subsequent operations with the associated DM server.

Pre-provisioning of OMA DM-related connection settings may be preferred over attempting to provision such settings "over the air" (OTA). The use of OTA techniques for the setting of OMA DM related connection settings introduces several new issues:

1. A device management server such as the DM server 109 of FIG. 2 may need to "know" when a new, un-provisioned electronic device such as the electronic device 107 of FIG. 2 attaches to a network.
2. Once a DM server is aware of the electronic device and of the MSISDN or MDN of the electronic device, the DM server may need to send bootstrap information using a WAP Push approach over SMS, which may require 12-14 SMS messages for each electronic device served.
3. Bootstrap provisioning over the air using a WAP Push approach over SMS may be inherently less secure than the pre-provisioning approach described above. As a result, user confirmation to accept the bootstrap provisioning messages may be involved.
4. Once a device has been bootstrapped with OMA DM parameters, security considerations may make it very difficult to "re-bootstrap" the previously established settings, lest the device be "hijacked" by a rogue DM server.

Regarding the above issue of letting a DM server such as, for example, the DM server 109 of FIG. 2 "know" when a previously un-provisioned electronic device attaches to the network, this may be addressed within the carrier's network, using either call detail records, electronic device detection using a SIM toolkit applet, or custom enhancements to the network to capture the international mobile equipment identity (IMEI) and MSISDN whenever a new electronic device such as the electronic device 107 of FIG. 2, for example, attaches to the network. In all these cases, the electronic device may simply wait until the DM server becomes aware of the electronic device, and the DM server sends a bootstrap message to the electronic device.

In a representative embodiment of the present invention, if no such network customization or SIM applet solution is deemed practical by the carrier, the electronic device (e.g., cellular phone, mobile handset, pager, or personal digital assistant) may provide "new subscriber detection" logic. For example, on power-up, the electronic device may check to see if the international mobile station identity (IMSI) on a connected SIM card is different from the IMSI detected on a connected SIM card at the time of the last power-up cycle. If a new IMSI is discovered, an electronic device in accordance with a representative embodiment of the present invention may send an SMS message to an SMS center (SMSC) of the serving carrier, as defined on the SIM card. The electronic device (e.g., 107 of FIG. 2) may use a pre-provisioned short code indicating the presence of a potentially new electronic device/subscriber combination on the network. Such an SMS message may contain the following information in comma separated values (CSV) format:

1. The IMEI of the electronic device, as a numeric string.
2. The IMSI of the electronic device, as a numeric string 3. The MSISDN of the electronic device, as a numeric string
4. Information identifying the manufacturer of the electronic device. This may be the same string used for the OMA DM ./DevInfo/Man management object.
5. Information identifying the model of the electronic device. This may be the same string used for the OMA DM ./DevInfo/Mod management object.
6. Information identifying the firmware version in the electronic device. This may be the same string used for the OMA DM ./DevDetail/FwV management object.
7. Information identifying the software version in the electronic device. This may be the same string used for the OMA DM ./DevDetail/SwV management object.

In a representative embodiment of the present invention, this simple SMS message may be used to provide a DM server such as the DM server 109 of FIG. 2, for example, with sufficient information to bootstrap an electronic device such as the electronic device 107 of FIG. 2 using an over-the-air approach, and to record manufacturer, model and version (MMV) information for the electronic device in the database of the DM server.

The actual bootstrap message may be sent to the electronic device via a WAP Push "bootstrap" message as defined in the OMA Client Provisioning Bootstrap specification named "OMA-WAP-ProvBoot-V1_1-20021112-C". This specification requires that NETWPIN, USERPIN, and USER-NETWPIN authentication methods be supported. When USERPIN, or USERNETWPIN is used, the user of the electronic device may be prompted to give consent to the bootstrap operation. If NETWPIN authentication is used, user prompts may not appear as long as the authentication succeeds. In this way, the carrier's management server may retain full control over user notification.

In a representative embodiment of the present invention, once an electronic device such as, for example, the electronic device 107 of FIG. 2 is bootstrapped, the electronic device may attempt to create an OMA DM session with a designated DM server such as the DM server 109 of FIG. 2, for example. If the connection to the DM server succeeds, but the electronic device fails to authenticate with the DM server, the settings in the electronic device may be deemed invalid. If the connection to the DM server fails, the electronic device may retry connecting with the indicated DM server up to, for example, three times, after which the settings may be deemed invalid and may be discarded as if the bootstrap message was never received. Once a successful connection and authentication is made with the DM server, these settings may be used in all subsequent operations with the associated DM server.

Once an electronic device such as the electronic device 107 of FIG. 2 has been successfully bootstrapped for a specific DM server, the OMA DM specifications provide no provision for changing the settings, for security reasons.

A number of security requirements and recommendations are specified in the OMA DM Security specification titled "OMA-SyncML-DMSecurity-V1_1_2-20031209-A". In light of the power of the OMA DM management protocol and the management objects defined herein for a representative embodiment of the present invention, an electronic device in accordance with a representative embodiment of the present invention may implement all "recommended" security elements. In addition, in a representative embodiment of the present invention, all OMA DM sessions between an electronic device such as the electronic device 107 of FIG. 2, for example, and a DM server such as the DM server 109 of FIG. 2, may use a secure transport protocol such as HTTPS/SSL.

Electronic devices in accordance with a representative embodiment of the present invention may implement mutual client and server authentication using the MD5 digest authentication method described in the OMA DM Security specification. This OMA DM Security method uses varying "nonce" values to guard against "replay attacks". This means that an electronic device such as, for example, the electronic device 107 of FIG. 2 may authenticate a DM server, and that the DM server may authenticate the electronic device. In a representative embodiment of the present invention, both password and nonce values may be 16 random octets or longer. Nonce values may be changed in an unpredictable manner for each new OMA DM session to guard against man-in-the-middle replay attacks.

In addition to the authentication provided within the OMA DM protocol, the OMA DM standards body also recommends that all OMA DM sessions take place over a secure transport protocol such as HTTPS/SSL. Use of secure transport provides for data encryption as well as an additional "layer" of authentication. A representative embodiment of the present invention may use a secure transport layer for encryption and authentication of all electronic devices like the electronic device 107 of FIG. 2, for example.

An electronic device in accordance with a representative embodiment of the present invention may employ a data integrity mechanism using an HMAC and MD5 hash code of the content of each message, as specified in the OMA DM Security specification.

One of the primary uses of the OMA DM protocol may be to provision network access parameters for various network applications used on an electronic device such as the electronic device 107 of FIG. 2, for example. Such provisioning may include Internet settings, browser bookmarks, email, MMS, etc. Unfortunately, the OMA DM standards body has yet to define standard objects for such parameter settings. A representative embodiment of the present invention may employ a set of registered OMA CP "application characteristics" that provide a complete, device independent definition of all the common data application settings.

Some of the management objects presented below are long and complex. Describing them in DDF format would make the descriptions virtually unreadable for all but the most determined readers. For this reason, a simple, commented tree notation is used herein, as demonstrated in the artificial example of Listing 1 that follows:

| Listing 1. | |
| --- | --- |
| Object | Interior node named "Object" |
|   Leaf_1 | Leaf node 1 of Object —legal values 1, 2 or 3 |
|   Leaf_2 | Leaf node 2 of Object—legal values 4, 5, 6 |
|   INode_2 | Interior node under Object |
|     Leaf_3 | Leaf node_3 - Object/INode/Leaf_3 - legal values 7, 8, 9 |
|     Leaf_4 | Leaf node_4 - Object/INode/Leaf_4 - legal values a, b, c |
|     <Recurring_INode> | Recurring interior node, each name <x> must be unique |
|       Leaf_5 | Leaf node_5 - Object/<x>/Leaf_5 - legal values d, e, f |
|       Leaf_6 | Leaf node_6 - Object/<x>/Leaf_6 - legal values x, y, z |
|   Leaf_7 | |
|   Leaf_8 | |

Recurring interior nodes may be used frequently to represent multiple instances of identical compound management objects, as might occur in a set of multiple email account settings. Recurring OMA DM interior nodes may be surrounded by < . . . > and each such interior node may have a unique node name. For example, the interior node <Recurring_INode> is repeated in Listing 1 for each instance of the pair of values Leaf_5 and Leaf_6. To refer to a generic recurring management object, the following notation is used herein:

Root/<generic_name>/leaf_node where <generic_name> may be replaced by an actual interior node name to reference a specific node.

It is recommended that one become familiar with the OMA DM protocol, specifically the following two documents to fully understand the management objects presented in this and later sections:

1. SyncML Device Management Protocol Version 1.1.2-specification "OMA-SyncML-DMProtocol-V1_1_2-20031203-A"
2. SyncML Device Management Tree and Description Version 1.1.2-specification "OMA-SyncML-DMTND-V1_1_2-20031202-A".

Each of the following "settings configuration" management objects are defined as if they were all separate, stand-alone management objects. In a representative embodiment of the present invention, all of the management objects in this section may be under a single root node called ./Settings.

The settings for basic Internet access have been defined in the OMA Client Provisioning standard titled "OMA-WAP-ProvCont-V1_1-20021112-C", that is hereby incorporated herein by reference, in its entirety. This document specifies the interpretation and meaning of each element that may be provisioned. The following OMA DM management object is defined herein to represent the information as an OMA CP provisioning document. This allows use of the detailed information specified in the OMA Client Provisioning standard. In a representative embodiment of the present invention, the element names remain the same, but are mapped to a more appropriate OMA DM format (e.g., PXLOGICAL becomes PxLogical).

The following management object of a representative embodiment of the present invention, in tree structure format, provides the provisioning capability defined in the OMA Client Provisioning (CP) specification. This management object defines many possible provisioning elements, with the understanding that some elements may not need to be implemented, depending on the type of network (e.g., CDMA, GSM, etc.) targeted by the electronic device.

The following discussion uses the notation used in the OMA CP specification, that is, bold underlines indicate parameters used for links, italics indicates parameters affected by external events, a plus sign (+) indicates that the parameter may occur 1 or more times, an asterisk character (*) indicates that the parameter may occur 0 or more times, a question mark (?) indicates that the parameter may occur 0 or 1 times, an empty set of parentheses ( ) indicates that the parameter may be required within the scope of the encapsulating characteristic and that it may occur only once.

It should be noted that a DM server such as, for example, the DM server 109 of FIG. 2 may not specify a value of a node that is indicated to occur 0 or more times, and that the value may still be supported by the electronic device nonetheless. The reader is referred to the OMA CP Specification incorporated by reference above, for details on the occurrence meaning and format of each element.

The OMA CP specification often uses an element with no value to indicate that the assumed value is "true", while the absence of the element indicates "false". In a representative embodiment of the present invention, such OMA CP elements (e.g., TRUST and MASTER) may be mapped as OMA DM Boolean leaf nodes, for example, Trust and Master, with actual values of true (1) and false (0), respectively.

Listing 2, below, shows an exemplary management object in accordance with a representative embodiment of the present invention that may correspond to, for example, the OMA CP PXLOGICAL characteristic that defines data network access via one or more proxy servers, for use with OMA DM:

Listing 2

```
PxLogical *          Interior node defining one or more logical Proxies
   <proxy_id>        ProxyID - Unique proxy ID for each collection of settings
      ProxyPw ?              Authentication password for the proxy
      PPGAuthType ?          Authentication method (e.g., HTTP-DIGEST)
      ProxyProviderID ?      Used to verify proxy identity
      Name             User readable proxy identity
      <Domains> * 0-4 Domains for which Proxy is responsible
            Domain         Domain name or address (absolute URI)
      Trust ?    Trusted proxy (e.g. for provisioning), Boolean value
      Master ?           May send navigation documents to device, true/false
      StartPage ?        Absolute URI to proxy start page
      BasAuthID ?        Basic authentication identifier
      BasAuthPW ?        Basic authentication password
      WSPVersion ?       WSP version supported by the proxy
      PushEnabled ?      Boolean, true if proxy supports push
      PullEnabled ?      Boolean, true if proxy supports pull
      <PxAuthInfo> *             Unique ID, in priority order, for each set of auth. data
            PxAuthType   Authentication type, e.g. "HTTP-DIGEST"
            PsAuthID ?   Client's authentication ID
            PsAuthPW ?   Client's authentication password
      <Port> *           Unique ID for each set of port data
            PortNbr      Port number (may imply service provided)
            Service ?    Service, may be omitted for well known ports
   <PxPhysical> *      Unique ID - sort order indicating priority
      PhysicalProxyID         Unique physical proxy ID
      <Domains> * 0-4 Domains for which Proxy is responsible
         Domain               Domain name or address (absolute URI)
      PxAddr                  Proxy address (IPV4, IPV6, phone number, etc.)
```

-continued

Listing 2

| | |
|---|---|
| PxAddrType ? | Proxy address type (IPV4 is the default) |
| PxAddrFQDN ? | Fully qualified domain name |
| WSPVersion ? | WSP version supported by the proxy |
| PushEnabled ? | Boolean, true if proxy supports push |
| PullEnabled ? | Boolean, true if proxy supports pull |
| <ToNapIDs> + | Unique ID - sort order indicating priority |
|   ToNapID | NAP ID referencing a specific network access point |

Listing 3, below, shows an exemplary management object in accordance with a representative embodiment of the present invention that may correspond to, for example, the of the OMA CP NAPDEF characteristic that defines one or more data network access points (e.g., a GPRS APN servers), for use with OMA DM:

Listing 3

| | |
|---|---|
| NapDef * | Interior node defining one or more access points |
|   <nap_id> | NapID - Unique access point ID (from NAPID) |
|     Bearer * | Network type (GPRS, CSD, 1xRTT, etc.) |
|     Name | User readable identity for this access point |
|     Internet ? | Boolean, true if this is an IP-routable access point |
|     NapAddress | Address (e.g., IPV4, IPV6, APN, phone number, etc.) |
|     NapAddrType ? | Address type (e.g., IPV4, IPV6, APN, phone number, etc.) |
|     <DNSAddrs> * | Unique ID - sort order indicating priority |
|       DNSAddr | IP address of a DNS server |
|       DNSAddr2 ? | IP address of secondary DNS server |
|       WINSAddr | IP address of a WINS server |
|       WINSAddr2 ? | IP address of secondary WINS server |
|     CallType ? | Call type, default ANALOG-MODEM |
|     LocalAddr ? | Local client address |
|     LocalAddrType ? | Local client address type (IPV4 or IPV6) |
|     LinkSpeed ? | Up link and possible down link speed |
|     DnLinkSpeed ? | Down link speed if different from LinkSpeed |
|     Linger ? | How long to keep alive with no data traffic |
|     DeliveryErrSdu ? | CDMA Specific, see also 3GPP2 4008 |
|     DeliveryOrder ? | CDMA Specific, see also 3GPP2 4008 |
|     TrafficClass ? | CDMA Specific, see also 3GPP2 4008 & 3107 |
|     MaxSduSize ? | CDMA Specific, see also 3GPP2 4008 |
|     MaxBitRateUpLink ? | CDMA Specific, see also 3GPP2 4008 |
|     MaxBitRateDnLink ? | CDMA Specific, see also 3GPP2 4008 |
|     ResidualBer ? | CDMA Specific, see also 3GPP2 4008 |
|     SduErrorRatio ? | CDMA Specific, see also 3GPP2 4008 |
|     TrafficHandlPrio ? | CDMA Specific, see also 3GPP2 4008 |
|     TransferDelay ? | CDMA Specific, see also 3GPP2 4008 |
|     GuaranteedBitRateUpLink ? | CDMA Specific, see also 3GPP2 4008 |
|     GuaranteedBitRateDnLink ? | CDMA Specific, see also 3GPP2 4008 |
|     MaxNumRetry ? | CDMA Specific, see also IS683B |
|     FirstRetryTimeout ? | CDMA Specific, see also IS683B |
|     ReRegThreshold ? | CDMA Specific, see also IS683B |
|     TBit ? | CDMA Specific, see also IS683B |
|     <NapAuthInfo> * | Unique ID, in priority order, for each set of auth. data |
|       AuthType | Authentication protocol, e.g. PAP, CHAP, MD5 |
|       AuthName ? | Authorization name |
|       AuthSecret ? | Authorization secret, depends on AuthType |
|       <AuthEntities> * | Unique ID - sort order indicating priority |
|         AuthEntity | Entities to which these credentials are valid |
|       SPI ? | Security Parameter Index, see also IS683B |
|     <Validities> * | Unique ID, in priority order, for each set of validity data |
|       Country ? | Mobile Country Code as defined by ITU-T [E212] |
|       Network ? | Mobile network codes, comma separated, per ITU-T [E212] |
|       SID ? | System ID's, comma separated, per TIA/EIA-136-005A |
|       SOC ? | System Operator Codes, per TIA/EIA-136-005A |
|       ValidUntil ? | Validity time in seconds from time received by device |

Listing 4, below, shows an exemplary management object that may represent an extension to the characteristics of the OMA CP standard, to allow management of default network connection settings using OMA DM, in accordance with a representative embodiment of the present invention:

|  | Listing 4 |
| --- | --- |
| Defaults * | Interior node defining default connection settings |
| Internet | General Internet default connection |
|   ConType | Selects NAP or Proxy connection type |
|   ConID | Selected NAP or Proxy ID |
| Work ? | Work connection |
|   ConType ? | Selects NAP or Proxy connection type |
|   ConID ? | Selected NAP or Proxy ID |
| WAP ? | WAP connection |
|   ConType ? | Selects NAP or Proxy connection type |
|   ConID ? | Selected NAP or Proxy ID |
| WAPSecure ? | Secure WAP connection |
|   ConType ? | Selects NAP or Proxy connection type |
|   ConID ? | Selected NAP or Proxy ID |

It should be noted that an electronic device in accordance with a representative embodiment of the present invention may implement only a device and network type specific subset of the above-defined management object. For example, elements specific to CDMA may be omitted for devices designed for GSM networks. Also, optional elements not specifically required by the OMA Client Provisioning Specification may also be omitted.

In a representative embodiment of the present invention, every electronic device such as, for example, the electronic device 107 of FIG. 2 may have a device-specific device descriptor framework (DDF), that defines the specific implementation of management objects on that electronic device.

A representative embodiment of the present invention may support the provisioning of browser bookmarks based on the OMA CP application characteristic registered with the "w2" APPID. The following Listing 5 shows an exemplary management object in accordance with a representative embodiment of the present invention that may correspond to, for example, the OMA CP "w2" application characteristic, for use with OMA DM:

|  | Listing 5 |
| --- | --- |
| Bookmarks * | Interior node defining one or more browser bookmarks |
|   Name ? | Name for this bookmark collection |
|   <to-nap_id> ? | Unique ID, in priority order, for each direct access point |
|     ToNapID | NAP ID for this access point |
|   <to-proxy> ? | Unique ID, in priority order, for each proxy |
|     ToProxy | Proxy ID for this proxy |
|   <Resources> + | Unique ID for each resource (bookmark) |
|     URI | Contains the absolute URI for the bookmark |
|     Name ? | User name for this bookmark |
|     AAuthType ? | Authentication type, HTTP-BASIC or HTTP-DIGEST |
|     AAuthName ? | Name for HTTP Authentication when bookmark accessed |
|     AAuthSecret ? | Password/Secret used in HTTP authentication |
|     StartPage ? | Boolean, true if bookmark is the start page (one only) |

The use of direct network access points and proxies may be mutually exclusive. One or more access points, or one or more proxies may be defined. If both are provided, the behavior may be undefined.

An electronic device in accordance with a representative embodiment of the present invention such as, for example, the electronic device 107 of FIG. 2 may implement all the elements of the Bookmarks management object, shown above.

The OMA CP Specification referenced above defines three separate OMA CP application characteristics that are registered for establishing email settings. The APPID 25 defines the SMTP settings, the APPID 110 defines POP3 settings, and the APPID 143 defines IMAP settings. These settings are bound together by a so called "provider ID". In a representative embodiment of the present invention, these three settings may be combined into the exemplary single OMA DM management object shown below in Listing 6:

|  | Listing 6 |
| --- | --- |
| Email * | Interior node defining one or more browser bookmarks |
|   <provider_id> * | Unique ID (IP address) for each of the email settings |
|     Name ? | User readable name for these settings |
|     Alias ? | Email alias used for these email settings |
|     Domain ? | Domain associated with these email settings |
|     ToNapID | NAP ID defining the access point for this email account |
|     SMTP ? | Interior node for the SMTP settings |
|       From | E-Mail address as specified in RFC822 |
|       RtAddr ? | Reply to address is different that "From" |
|       Addr | Specifies the address of the sending host |
|       AddrType ? | IPV4 or IPV6, IPV4 assumed if missing |
|       PortNbr ? | Port 25 assumed if missing |
|       Service | 25 for unsecured or STARTTLS for secure connection |
|       AAuthType ? | CRAM-MD5, DIGEST-MD5, LOGIN, PLAIN |
|       AAuthName ? | SMTP Login name |
|       AAuthSecret ? | SMTP login password/secret |
|     POP3 ? | Interior node for POP3 settings (excludes use of IMAP4) |
|       Addr | Specifies the address of the receiving POP3 host |
|       AddrType ? | IPV4 or IPV6, IPV4 assumed if missing |
|       PortNbr ? | 110, 995, or non-standard port, 110 assumed if missing |
|       Service | 110 for unsecured, 995 or STARTTLS for secure access |
|       AAuthType ? | APOP, CRAM-MD5, DIGEST-MD5, GSSAPI, KERBEROS_V4, LOGIN, PLAIN, SKEY |
|       AAuthName ? | POP mailbox Login name |

-continued

Listing 6

| | |
|---|---|
| AAuthSecret ? | POP mailbox login password/secret |
| IMAP4 ? | Interior node for IMAP4settings (excludes use of POP3) |
| Addr | Specifies the address of the receiving IMAP4settings host |
| AddrType ? | IPV4 or IPV6, IPV4 assumed if missing |
| PortNbr ? | 143 or 993 or non-standard port, 143 assumed if missing |
| Service | 143 for unsecured, 993 or STARTTLS for secure access |
| AAuthType ? | CRAM-MD5, DIGEST-MD5, GSSAPI, KERBEROS_V4, LOGIN, PLAIN, SKEY |
| AAuthName ? | IMAP4 settings mailbox Login name |
| AAuthSecret ? | IMAP4 settings mailbox login password/secret | where the following references may be used for the keywords in the email object:

| | |
|---|---|
| STARTTLS | Indicates that secure connection may be negotiated as specified in Internet Engineering Task Force (IETF) RFC2487. |
| CRAM-MD5 | Indicates that Challenge-Response Authentication Mechanism may be used as defined in IETF RFC2195. |
| DIGEST-MD5 | Indicates that HTTP Digest Access Authentication may be used as defined in IETF RFC2831. |
| LOGIN | Indicates that the LOGIN authentication mechanism may be used as defined in IETF RFC2060. |
| PLAIN | Indicates that the PLAIN authentication mechanism may be used as defined in IETF RFC2595. |
| APOP | Indicates that the MD5 digest mechanism may be used as defined in IETF RFC1939. |
| GSSAPI | Indicates that GSSAPI authentication mechanism may be used as defined in IETF RFC1508. |
| KERBEROS_V4 | Indicates that Kerberos version 4 authentication mechanism may be used as defined in IETF RFC1731. |
| SKEY | Indicates that SKEY authentication mechanism may be used. See IETF RFC 2289 and RFC 2444. |

An electronic device in accordance with a representative embodiment of the present invention such as, for example, the electronic device 107 of FIG. 2 may implement all the elements of the Email management object, shown above.

The following Listing 7 shows an exemplary management object in accordance with a representative embodiment of the present invention that may correspond to, for example, the OMA CP APPID application characteristic for MMS settings registered as the APPID "w4", for use with OMA DM:

Listing 7

| | |
|---|---|
| MMS * | Interior node defining the MMS settings |
| Name ? | User displayable name for MMS Proxy-Relay |
| <to-proxy> ? | Unique ID, in priority order, for each useable proxy |
| ToProxy | Proxy ID for this proxy |
| <to-nap_id> ? | Unique ID, in priority order, for each direct access point |
| ToNapID | NAP ID for this access point |
| Addr | Absolute MMS Proxy-Relay URL |
| CM ? | R (restricted), W (warning), or F (free) |

The CM element may establish the "creation mode" as defined in the OMA Specification "OMA-MMS-CONF-V1_2". The use of direct network access points and proxies may be mutually exclusive. One or more access points, or one or more proxies may be defined. If both are provided, the behavior may be undefined.

An electronic device in accordance with a representative embodiment of the present invention such as, for example, the electronic device 107 of FIG. 2 may implement all the elements of the MMS management object, shown above.

Listing 8, below, shows an exemplary management object in accordance with a representative embodiment of the present invention, that may correspond to, for example, the OMA CP APPID application characteristic for Instance Messaging and Presence Services (IMPS) settings registered as APPID "wA", for use with OMA DM:

Listing 8

| | |
|---|---|
| IMPS * | Interior node defining the IMPS settings |
| ProviderID | Provider ID, specified as a unique IP address |
| Name ? | User displayable name for the IMPS server |
| AAccept | Server content type codes with version numbers |
| Addr | IMPS server address |
| AddrType | IPV4, IPV6, E164 (phone number) |
| <to-proxy> ? | Unique ID, in priority order, for each useable proxy |
| ToProxy | Proxy ID for this proxy |
| <to-nap_id> ? | Unique ID, in priority order, for each direct access point |
| ToNapID | NAP ID for this access point |
| AAuthLevel ? | APPSRV (default for HTTP connection) or OBEX |
| AAuthName ? | Name to use for authentication to the IMPS server |
| AAuthSecret ? | Password/Secret for IMPS server authentication |

Values that may be valid for AAccept include:

application/vnd.wv.csp+xml;1.2;1.1;1.0 application/vnd.wv.csp+wbxml;1.2;1.1;1.0

An electronic device in accordance with a representative embodiment of the present invention such as, for example, the electronic device 107 of FIG. 2 may implement all the elements of the IMPS management object, shown above.

Listing 9, below, shows an exemplary management object in accordance with a representative embodiment of the present invention, that may correspond to, for example, the OMA CP APPID application characteristic for SyncML Data Synchronization (PIM Sync) settings registered as APPID "w5", for use with OMA DM:

Listing 9

| | |
|---|---|
| Sync * | Interior node defining the data sync settings |
| Name ? | User displayable name for the synchronization server |
| <to-proxy> ? | Unique ID, in priority order, for each useable proxy |
| ToProxy | Proxy ID for this proxy |
| <to-nap_id> ? | Unique ID, in priority order, for each direct access point |
| ToNapID | NAP ID for this access point |
| Addr | Absolute URI for the sync server |
| AddrType | IPV4, IPV6, E164 (phone number) |
| PortNbr | Port number for connection with sync server |
| AAuthLevel ? | APPSRV, CLIENT, or OBEX |
| AAuthType ? | HTTP-BASIC, HTTP-DIGEST, BASIC, DIGEST, X509, SECUREID, SAFEWORD, DIGIPASS |
| AAuthName ? | Name authentication to the sync server |
| AAuthSecret ? | Password/Secret for sync server authentication |
| AAuthData ? | Nonce value for sync server authentication |
| <Resources> | Unique ID for each unique database resource |
| AAccept | Specifies the content type the database supports |
| URI | Specifies the server database URI |
| CliURI ? | Specifies the client database URI |
| Name ? | A readable user name for the server database |
| AAuthType ? | HTTP-BASIC, HTTP-DIGEST, BASIC, DIGEST, |
| X509, | SECUREID, SAFEWORD, DIGIPASS |
| AAuthName ? | Database access name |
| AAuthSecret ? | Database access password |

Additional details and external reference material on the various element values that may be used within the Sync object are listed below:

| | |
|---|---|
| APPSRV | Credentials the client uses to authenticate itself to the OMA DS Server at the DS protocol level. |
| CLIENT | Credentials the server uses to authenticate itself to the OMA DS Client at the DS protocol level. |
| OBEX | Client credentials for OBEX (e.g., Bluetooth) authentication. |
| HTTP-BASIC | HTTP basic authentication done according to RFC 2617. |
| HTTP-DIGEST | HTTP digest authentication done according to RFC 2617. |
| BASIC | OMA DS 'syncml:auth-basic' authentication as specified in "SyncML Data Synchronization Representation Protocol". |
| DIGEST | OMA DS 'syncml:auth-md5' authentication as specified in "SyncML (Data Synchronization) Representation Protocol". |
| DIGEST | OMA DS 'syncml:auth-x509' done according to "SyncML (Data Synchronization) Representation Protocol". |
| SECURID | OMA DS 'syncml:auth-securid' authentication done according to "SyncML (Data Synchronization) Representation Protocol". |
| SAFEWORD | OMA DS 'syncml:auth-safeword' authentication done according to "SyncML (Data Synchronization) Representation Protocol". |
| DIGIPASS | OMA DS 'syncml:auth-digipass' authentication done according to "SyncML (Data Synchronization) Representation Protocol". |

An electronic device in accordance with a representative embodiment of the present invention such as, for example, the electronic device 107 of FIG. 2 may implement all the elements of the Sync management object, shown above.

There are presently no OMA standard or registered application characteristics defined for provisioning SMSC settings. The following Listing 10 shows an exemplary SMSC management object for use with OMA DM, in accordance with a representative embodiment of the present invention, that may address this shortcoming of the prior art:

Listing 10

| | |
|---|---|
| SMSC * | Interior node defining key SMSC settings |
| <SMSCs> | Unique name for each addressable SMSC |
| Addr | Outbound SMSC international phone number |
| TransMode | 0 = GPRS, 1 = CS, 2 = GPRS preferred with CS backup |
| Expire | Message expiration time in hours, 0 = indefinite |
| CharSet | 7 for 7-bit, 8 for 8-bit |
| Default | Boolean, only one SMSC may be set to true |

In a representative embodiment of the present invention, if one SMSC is set as the default SMSC, the default elements of other SMSCs may be set to false. The most recent SMSC set as the default SMSC may prevail. It is permissible to have no SMSC set as the default SMSC.

An electronic device in accordance with a representative embodiment of the present invention such as, for example, the electronic device 107 of FIG. 2 may implement all the elements of the SMSC management object, shown above.

In a representative embodiment of the present invention, DM server initiated provisioning or retrieval of any of the above management object settings may be initiated using a standard OMA DM Notification message, as defined in the OMA DM specification document named "OMA-SyncML-DMRepPro-V1_1_2-20030613-A". An electronic device in accordance with a representative embodiment of the present invention may employ a 2-bit user interaction mode value that allows a DM server such as, for example, the DM server 109 of FIG. 2 to advise an electronic device (e.g., 107 of FIG. 2) if and how the user of the electronic device should be notified of the requested OMA DM operation. Interpretation of these user interaction codes may support the following interpretations of the user interaction mode value:

| | | |
|---|---|---|
| 00. | Not Specified | May be used by the server to trigger the device default for user interaction. |
| 01. | Background Management Action | The operation may proceed without user notification or approval. |
| 02. | Informative Management Action | The user may be notified as the management action proceeds. |
| 03. | User Interaction before the Management Action | The user is prompted for acceptance before the management is allowed to proceed. |

The following management objects may be used in a representative embodiment of the present invention in over-the-air (OTA) profiling of electronic devices, to retrieve and analyze information beyond the settings discussed above. Unlike provisioning settings which can be both read and written, elements of the following management objects such as, for example, "memory used" may be read-only, and may not be able to be reset by a DM server such as, for example, the DM server 109 of FIG. 2.

In a representative embodiment of the present invention, the user interaction behavior discussed above, may be applied to all OMA DM management actions.

A representative embodiment of the present invention may support a HwInfo management object, illustrated in the exemplary HwInfo management object of Listing 11, below. Such a management object may be located under, for example, the ./DevDetail/Ext node of an OMA device management tree. Other locations for such a management object are also contemplated. The HwInfo management object may describe information about the physical hardware of an electronic device in accordance with a representative embodiment of the present invention such as the electronic device 107 of FIG. 2, for example. This management object supplements the information (e.g., IMEI, Manufacturer, Model, version, etc.) that is currently provided within the standard DevInfo and DevDetail management objects defined in the OMA DM specifications. All information elements in the HwInfo management object may be read only.

| Listing 11 | |
|---|---|
| HwInfo | Interior node defining HW information to be profiled |
|   OEMInfo | Information such as OEM ID, etc. |
|   Platform | Platform information |
|     Name | Software platform (Symbian, MS Smart phone, etc.) |
|     MajorVer | Major version |
|     MinorVer | Minor version |
|     BuildNbr | Build Number |
|   Processor | Processor information |
|     Architecture | INTEL, MIPS, SHX, ARM, IA64, etc. |
|     Model | ARM720, STRONGARM, HITACHI SH4, etc. |
|     Level | Processor revision level |
|   BatteryLevel | Percentage, 0 to 100% |
|   ACPower | Boolean, true if connected to AC outlet |
|   Memory | Memory information |
|     ROM | Internal ROM memory size in KB |
|     Internal | Internal physical RAM memory information |
|       Total | Total memory installed in KB |
|       Available | Available memory in KB |
|     Virtual | Virtual memory information |
|       Total | Total memory installed in KB |
|       Available | Available memory in KB |
|     External | External physical RAM memory information |
|       Total | Total memory installed in KB |
|       Available | Available memory in KB |
|   Summary | Summary of all above element values in CSV format |

An electronic device in accordance with a representative embodiment of the present invention such as, for example, the electronic device 107 of FIG. 2 may implement all the elements of the HWInfo management object, shown above.

A representative embodiment of the present invention may support a NetInfo management object, illustrated in the exemplary NetInfo management object of Listing 12, below. The NetInfo management object may describe information and status about the mobile network supporting an electronic device in accordance with a representative embodiment of the present invention such as the electronic device 107 of FIG. 2, for example. All information elements in the NetInfo management object may be read only.

| Listing 12 | |
|---|---|
| NetInfo | Interior node defining key Network settings and status |
|   PLMN | PLMN ID from SIM card |
|   Registered | Boolean, true if registered |
|   NetShort | User readable short network name |
|   NetLong | User readable long network name |
|   Roaming | Boolean, true if roaming |
|   SID | Current System ID |
|   NID | Current Network ID |
|   CellID | Cell ID |
|   LAC | Location area code |
|   CC | Country code |
|   Signal | Signal strength, 0% to 100% |
|   SMSCAddr | Service center address (phone number) from SIM |
|   PhoneID | IMSI for GSM, MIN for CDMA |
|   PhoneNum | MSISDN for GSM, MDN for CDMA |
|   Summary | Summary of all above element values in CSV format |

An electronic device in accordance with a representative embodiment of the present invention such as, for example, the electronic device 107 of FIG. 2 may implement all the elements of the NetInfo management object, shown above.

A representative embodiment of the present invention may support an AppInfo management object, illustrated in the exemplary AppInfo management object of Listing 13, below. The AppInfo management object may provide a list of all installed and running applications on an electronic device in accordance with a representative embodiment of the present invention such as the electronic device 107 of FIG. 2, for example. All information elements in the AppInfo management object may be read only.

| Listing 13 | |
|---|---|
| AppInfo | Interior node defining application information and status |
|   AppsInstalled | Number of applications installed |
|   AppsRunning | Number of applications currently running |
|   <AppList> | Unique application ID |
|     Name | User readable name of the application |
|     Version | Application version |
|     Size | Application storage size |
|     Running | Boolean, true if the application is running |
|     Memory | Application memory usage if running, else 0 |
|     Threads | Thread count if running, else 0 |
|     ProcessID | Process ID if running, else 0 |

In a representative embodiment of the present invention, a Handset Control object, described below, defines commands for stopping or deleting applications identified with the AppInfo object.

An electronic device in accordance with a representative embodiment of the present invention such as, for example, the electronic device 107 of FIG. 2 may implement all the elements of the AppInfo management object, shown above.

A representative embodiment of the present invention may support a Control management object, illustrated in the exemplary Control management object of Listing 14, below. Such a management object may be located under, for example, the ./DevDetail/Ext management object of an OMA device management tree. Other locations for such a management object are also contemplated. The Control management object may provide a simple and extensible means of sending administrative commands to an electronic device in accordance with a representative embodiment of the present invention such as the electronic device 107 of FIG. 2, for example. In the example of Listing 14, a single "command" string may be used to specify the operation to be performed. To execute a command, a DM server such as the DM server 109 of FIG. 2, for example, may set the command string to the desired command and may issue an Exec command on the command string object. A "results queue" may be provided for the recording of the results of one or multiple commands.

The Control management object may be defined as shown in Listing 14, below:

| Listing 14 | |
|---|---|
| ./DevDetail/Ext/Control | |
|   Command | Command string as defined below |
|   Locked | "true" if the device is locked, "false" otherwise | where the Command element may be as follows:
  LockDevice—causes the device to become locked
  UnlockDevice—causes a locked device to become unlocked
  Stop Applications—causes specified running applications to be stopped <Data>ProcessID=123</Data>—Causes process 123 to be stopped <Data>ProcessID=234</Data>—Causes process 234 to be stopped Multiple processes can be stopped with a single command Delete Applications—causes specified applications to be deleted from the device <Data>AppID=123</Data>—Causes AppID 123 to be deleted <Data>AppName=Cabir</Data>—Causes application "Cabir" to be deleted Multiple applications can be deleted with a single command ClearDevice—clear the data specified by the Exec parameters <Data>Settings=true</Data>—Causes all provisioning to be cleared <Data>UserData=true</Data>—Causes all user data to be cleared <Data>Applications=true</Data>—Causes all applications to be cleared SoftReset—Causes the device to perform a soft reset In the example of Listing 15, below, the provisioning parameters and applications are to be cleared, while the user data is to be preserved:

Listing 15

```
<Replace>
    <CmdID>3</CmdID>
    <Item>
        <Target>
            <LocURI>./Control/Command</LocURI>
        </Target>
        <Data>ClearDevice</Data>
    </Item>
</Replace>
<Exec>
    <CmdID>4</CmdID>
    <Item>
        <Target>
            <LocURI>./Control/Command </LocURI>
        </Target>
        <Data>Settings=true</Data>
        <Data>UserData=false</Data>
        <Data>Applications=True</Data>
    </Item>
</Exec>
```

An electronic device in accordance with a representative embodiment of the present invention such as, for example, the electronic device 107 of FIG. 2 may implement all aspects of the Control management object, shown above.

In a representative embodiment of the present invention, the user interaction behavior discussed previously, may be applied to all OMA DM management actions.

An electronic device in accordance with a representative embodiment of the present invention such as, for example, the electronic device 107 of FIG. 2 may implement the OMA DM Firmware Update Management Object (FUMO) for updating firmware in electronic devices. The FUMO management object specifies the handling of an update employing one or more firmware "update packages". An update package may, for example, contain a set of instructions executable by an electronic device such as the electronic device 107 of FIG. 2, for example, to update/transform/convert a firmware component in the electronic device from one specific version of the firmware to another. The number of such packages that may be used to update the firmware of a specific electronic device may be dependent upon the electronic device to be updated. A representative embodiment of the present invention may allow all firmware in an electronic device to be updated in a manner equivalent to re-flashing the electronic device via a cable (i.e., wired) connection.

In a representative embodiment of the present invention, the user interaction behavior discussed previously, may be applied to all OMA DM management actions, including firmware update.

The OMA DM standard defines a single FUMO object that may be replicated to accommodate as many update packages as may be involved in the update of an electronic device. The standard does not state where the FUMO management object is to reside in the logical device management tree. Listing 16 illustrates an exemplary management object description that illustrates a FUMO management object implemented under a root node named ./FwUpdate:

Listing 16

| | |
|---|---|
| FwUpdate | Interior node for all firmware update packages |
| <packages> | Unique ID, one interior node per package |
| PkgName ? | Optional name of this update package |
| PkgVersion ? | Optional version of this update package |
| Download | Node used by Exec to initiate package download (only) |
| PkgURL | URL to location from which to download the package |
| Update | Node used by Exec to initiate package update (only) |
| PkgData | Package data (see implementation requirements below) |
| DownloadAndUpdate | Node used by Exec to initiate package download and update |
| PkgURL | URL to location from which to download the package |
| State | One of N possible update states per the FUMO specification |
| Ext | Node for possible device specific extensions |

The OMA DM FUMO specification allows the package contents to be downloaded directly into the PkgData element using an OMA DM Replace command, or alternatively from an external content management server defined by PkgURL. An electronic device in accordance with a representative embodiment of the present invention may use the alternative download method, leveraging the capabilities of the OMA Download OTA protocol. Using the OMA Download OTA protocol provides the following advantages over use of the OMA DM Replace method to a representative embodiment of the present invention. First, using OMA Download allows an electronic device in accordance with the present invention such as the electronic device 107 of FIG. 2, for example, to recover from an interrupted download at the point of interruption. Using HTTP byte range operations, the electronic device may restart the download after the last successfully downloaded byte range. The OMA DM Specification provides no equivalent mechanism, requiring the download to be restarted from the beginning. Representative embodiments of the present invention may use OMA Download and byte range operations to allow an interrupted download to restart from the point of failure.

Second, the OMA download specification provides the concept of a separate "Download Descriptor" that provides additional information about the package, which may be used to display information to the user of the electronic device prior to the actual download. Such information may include estimated download time and a brief description of the update. Such information may be presented to the user prior to gaining user approval for the update.

Third, the use of OMA download for firmware update allows a representative embodiment of the present invention to reuse the download approach for application and content download, presenting the same basic capabilities and information to the DM server, a client in the electronic device, and the user of the electronic device. The OMA Download Descriptor in a representative embodiment of the present invention may be patterned after the Java download Java Application Descriptor (JAD), allowing reuse of the same basic set of services.

Fourth, OMA Download and Java Download may represent the most common means for supporting user and client initiated application content download.

An electronic device in accordance with a representative embodiment of the present invention such as, for example, the electronic device 107 of FIG. 2 may support all behaviors of the FUMO management object, shown above, and may include a number of capabilities. First, the OMA Download method may be supported. Second, recovery from an interrupted download may proceed from the point after the last successfully transferred byte range, after a check is made of the download descriptor and package header data to ensure that the package has not changed. Third, information from the download descriptor may be available for display to the user of the electronic device. The display of information from the download descriptor may not occur in cases where the update is being done in "background" mode.

An electronic device in accordance with a representative embodiment of the present invention may support both device-initiated and server-initiated content download. Electronic device-initiated download may be initiated via a browser on the electronic device, or by invoking a menu item to access a known content download server. In either case, OMA DM management objects and operations may not be involved in the case of download initiated by an electronic device. All electronic device initiated content download may be accomplish using either Java Download or the OMA Download OTA protocol.

For server initiated download, a representative embodiment of the present invention may use an adaptation of the OMA DM Firmware Update Management Object (FUMO) to initiate the download and collect status upon completion of the download, and for subsequent installation of the downloaded content.

In a representative embodiment of the present invention, the user interaction behavior discussed previously, may be applied to all OMA DM management actions, including content download.

A representative embodiment of the present invention may support a Content Download Object (CDO) based on an adapted subset of the OMA DM FUMO management object, using the "alternate download" method described above. The CDO management object may be used to provide one or more universal resource locators (URLs) to an electronic device client such as, for example, the DM client 163 of FIG. 2, indicating the content to be downloaded. The electronic device client may, for example, use such URLs to contact the indicated content server(s) and download the software/firmware using OMA Download OTA V1.0 protocol, for example.

Depending upon the actions specified by the CDO management object, an electronic device client may be directed to install content after completing a download of the content. Once all operations initiated using the CDO management object are complete, the electronic device client may initiate an OMA DM status reporting session with a DM server, to report the final status of the operation.

In a representative embodiment of the present invention, a CDO management object may be a root object (./CDO) derived directly from the FUMO and may be defined as follows:

| CDO | Interior node for all content download operations |
|---|---|
| <content> | Unique ID, one interior node per content download |
| ContentName ? | Optional name of the application or content to download |
| ContentVersion ? | Optional version of the application or content |
| Download | Node used by Exec to initiate content download (only) |
| ContentURL | URL to location from which to download the content |
| Update | Node used by Exec to initiate content installation (only) |
| ContentData | Content data (see the FUMO implementation requirements) |
| DownloadAndInstall | Node used by Exec to initiate package download and install |
| ContentURL | URL to location from which to download the content |
| State | One of N possible update states per the FUMO specification |

In a representative embodiment of the present invention, a CDO management object may behave like a FUMO management object in all respects with the following adaptations:

1. The "Ext" management object may be omitted.
2. The concept of "package" may be mapped to "content".
3. The concept of "update" may be mapped to "install". Note that installation may imply the update or deletion of a prior version of the same content.
4. The OMA Download method with interruption recovery may be available.
5. A "Download Descriptor" may be used to provide information to the user of an electronic device, and this may hold true during "background" operations.

A representative embodiment of the present invention may follow the OMA FUMO specification, in all download initiation, state management, and final status reporting aspects, in which the term "content" may be substituted for term "package", and the term "install" may be substituted for term "update".

An electronic device in accordance with a representative embodiment of the present invention may conform to all mandatory requirements specified in the OMA DM conformance specification named "OMA-SyncML-DMConReqs-V1_1_2-20030613-A". In addition, such an embodiment may support the following elements:

1. All protocol elements that support the FUMO object (and thus the CDO object), including Alert 1226 and the Alert Correlator may be supported.
2. The Moredata common use element may be supported for sending and receiving.
3. Atomic may be supported.
4. Exec may be supported in the context of the FUMO and CDO objects.
5. Session Abort Alert may be supported for sending and receiving.
6. Large Object handling may be supported for sending and receiving.
7. Client Event Alerts may be supported.
8. MaxMsgSize may be supported for sending and receiving.

9. MaxObjSize may be supported for sending and receiving.
10. MD5 (Chal) may be supported for sending and receiving.
11. MD5 (Cred) may be supported for sending and receiving.
12. HMAC (Chal) may be supported for sending and receiving.
13. HMAC (Hdr) may be supported for sending and receiving.
14. Notification may be supported, along with support for user interaction mode as detailed in the User Interaction Requirements section.
15. Bootstrap using the OMA DM "plain profile" may be supported In addition, an electronic device in accordance with a representative embodiment of the present invention may support session authentication and data encryption over HTTPS.

Figure 3:
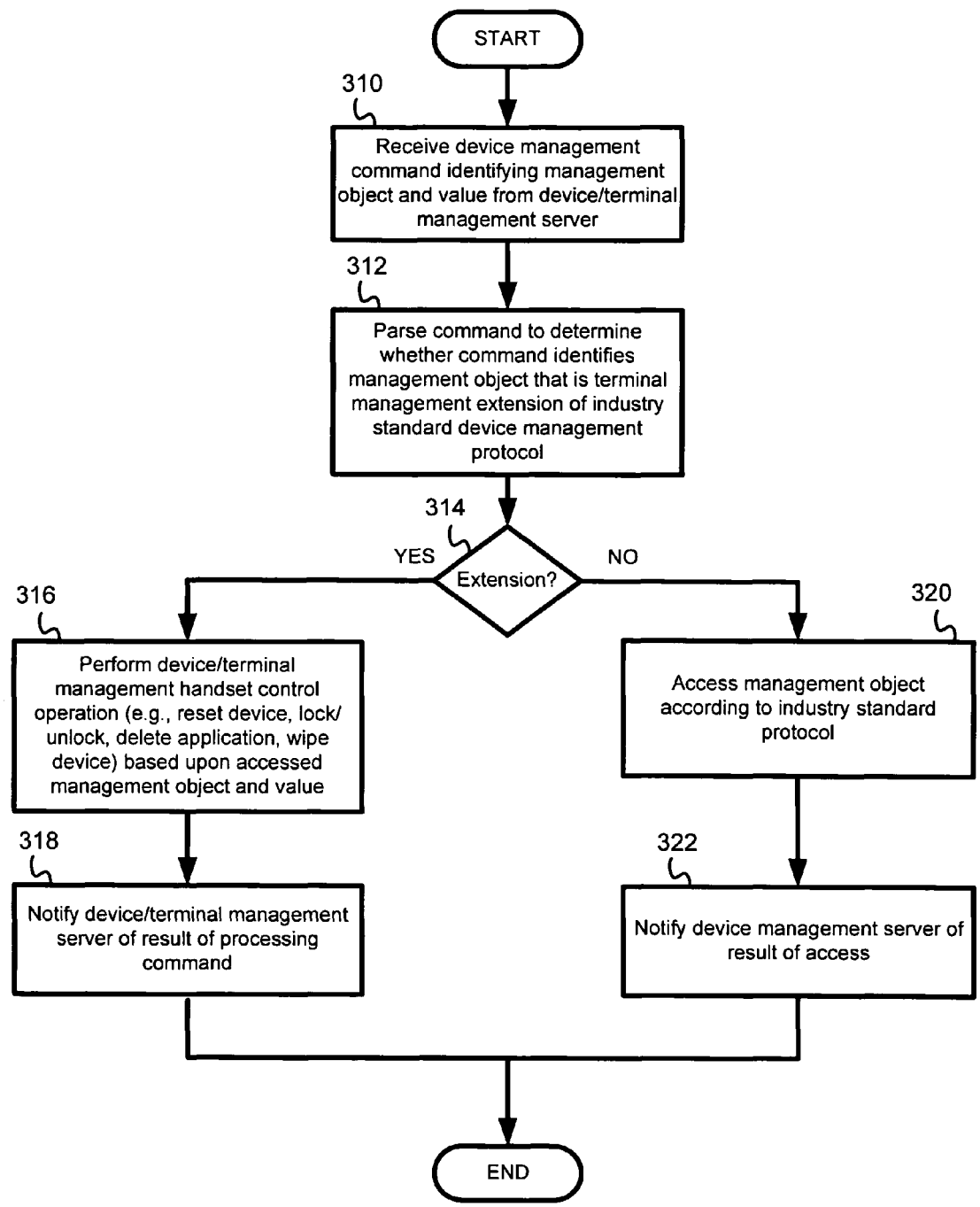
FIG. 3 shows a flowchart illustrating an exemplary method supporting handset control extensions for terminal management to an industry standard device management protocol, the method for use with an electronic device such as, for example, the electronic device of FIG. 2, in accordance with a representative embodiment of the present invention.

FIG. 3 shows a flowchart illustrating an exemplary method supporting handset control extensions for terminal management to an industry standard device management protocol, the method for use with an electronic device such as, for example, the electronic device 107 of FIG. 2, in accordance with a representative embodiment of the present invention. The illustrated method begins after power-up and establishment of a communication path between the electronic device and a device/terminal management server such as, for example, the device management server 109 of FIG. 2. At step 310, an electronic device such as, for example, the electronic device 107 of FIG. 2, may receive a device management command identifying a management object and a value from a device/terminal management server such as, for example, the device management server 109 of FIG. 2. The device management command may be parsed to determine whether the command identifies a management object that is a terminal management extension of industry standard device management protocol, at block 312. As described above, terminal management extensions to an industry standard device management protocol such as, for example, the Open Mobile Alliance (OMA) device management (DM) protocol, may comprise handset control aspects for accessing management objects not defined as a part of the industry standard protocol. Such control commands may include, for example, "reset device", "lock/unlock", and "delete application", to name only three. It should be clear that the examples set forth herein are for illustration only, and are not specific limitations of the present invention. A greater or lesser number and/or a different set of handset control commands and management objects may be employed for terminal management without departing from the spirit and scope of the present invention.

If it is determined, at block 314, that the received command is an extension to the industry standard device management protocol, the electronic device may perform one or more device/terminal management handset control operations (e.g., reset device, lock/unlock, delete application, wipe device) based upon the accessed management object and received value. Such handset control operations and management objects are described above. Upon completion of the indicated command, the electronic device may notify the device/terminal management server of the result of processing of the command (at block 318). If, however, the electronic device determine that the received command is not an extension to the industry standard device management protocol, the electronic device may, at block 320, access a management object as defined by the specification of the industry standard protocol. Such actions may include, for example, retrieving a management object value, adding a management object, deleting a management object, and modifying a value of a management object. The electronic device may then notify the device management server of any results from the access (at block 322).

Aspects of the present invention may be found in an electronic device supporting remote terminal management. Such a device may comprise communication circuitry that enables wireless communication with at least one remote server via a wireless network, and at least one memory containing machine readable code executable by a processor. The device may also comprise at least one processor operably coupled to the communication circuitry and the at least one memory. The machine readable code may enable access to a first plurality of management objects in accordance with an Open Mobile Alliance (OMA) device management (DM) protocol. The machine readable code may also enable access to a second plurality of management objects not explicitly defined within the base 1.2 OMA DM protocol. In a representative embodiment of the present invention, access to a management object in the second plurality of management objects may invoke an associated electronic device control action.

In various representative embodiments in accordance with the present invention, the wireless network may comprise one of the following: a cellular telephone network, a wireless wide area network, a wireless local area network, and a paging network. The at least one memory may comprise non-volatile memory, at least a portion of a device profile may be stored in the non-volatile memory, and the non-volatile memory may comprise flash-type memory. The machine readable code may enable collection of one or more quality of service parameters related to operation of the electronic device. The control actions associated with the second plurality of management objects may comprise one of the following: an action to reset the electronic device, an action to lock the electronic device, an action to unlock the electronic device, an action to delete a firmware or software application from the electronic device, and an action to wipe memory of the electronic device. In a representative embodiment of the present invention, the control actions associated with the second plurality of management objects may comprise reporting device status information, executing an associated management task and returning results thereof, and returning results of a prior control action. In some representative embodiments of the present invention, at least one of the following: a frequency and a format of returned results, may be configurable.

In various representative embodiments of the present invention, the electronic device may comprise one of the following: a cellular telephone, a pager, a personal digital assistant, and a personal computer. Access to a management object may comprise one of the following: retrieving a value of the management object, deleting the management object, creating the management object, and modifying a value of the management object. At least a portion of the second plurality of management objects may add information about the electronic device by incorporating additional management objects in the OMA DM ./DevInfo and ./DevDetail management objects. The additional management objects may comprise information about at least one of the following: an original equipment manufacturer, a software or firmware platform, a processor, a battery level, a power source, and a memory.

Additional aspects of the present invention may be seen in a terminal management server. A terminal management server in accordance with a representative embodiment of the present invention may comprise at least one memory containing machine executable code for accessing, in a remote electronic device via a communication network, a first plurality of management objects compliant with an Open Mobile Alliance (OMA) device management (DM) standard. The server may comprise at least one processor that may be operably coupled to the at least one memory. The at least one memory may comprise machine executable code for accessing, in the remote electronic device, a second plurality of management objects not explicitly defined within the base 1.2 OMA DM standard, and for accessing a management object in the second plurality of management objects may invoke an associated device control action in the remote electronic device.

In a representative embodiment of the present invention, the communication network may comprise one of the following: a cellular telephone network, a wireless wide area network, a wireless local area network, and a paging network, and the remote electronic device may comprise one of the following: a cellular telephone, a pager, a personal digital assistant, and a personal computer. Accessing a management object may comprise one of the following: retrieving a value of the management object, deleting the management object, creating the management object, and modifying a value of the management object, and the control actions associated with the second plurality of management objects may comprise one of the following: an action to reset the electronic device, an action to lock the electronic device, an action to unlock the electronic device, an action to delete a firmware or software application, and an action to wipe memory of the electronic device.

In a representative embodiment of the present invention, at least a portion of the second plurality of management objects may provide additional information about the electronic device by incorporating additional management objects in the OMA DM ./DevInfo and ./DevDetail management objects. The additional management objects may comprise information about at least one of the following: an original equipment manufacturer, a software or firmware platform, a processor, a battery level, a power source, and a memory.

Further aspects of the present invention may be observed in a system for remotely managing a plurality of electronic devices via a communication network. Such a system may comprise a first server communicatively coupled to the plurality of electronic devices via a wireless communication network. The first server may comprise machine readable storage containing executable code enabling terminal management of the plurality of electronic devices using a first set of management objects compliant with an industry standardized device management protocol, and a second set of management objects not supported by the industry standard device management protocol. The system may also comprise a second server communicatively coupled to the first server, and the second server may comprise machine readable storage containing executable code enabling customer service activities for the plurality of electronic devices. The first server may support terminal and device management activities in at least one of the plurality of electronic devices by the second server, by accessing at least one of the second set of management objects.

In a representative embodiment of the present invention, accessing one of the second set of management objects in the electronic device may invoke an associated electronic device control action in the electronic device. The electronic device control action may comprise one of the following: an action to reset the electronic device, an action to lock the electronic device, an action to unlock the electronic device, an action to delete a firmware or software application, and an action to erase memory of the electronic device. Accessing a management object may comprise one of the following: retrieving a value of the management object, deleting the management object, creating the management object, and modifying a value of the management object. The electronic device may comprise one of the following: a cellular telephone, a pager, a personal digital assistant, and a personal computer, and the industry standard device management protocol may comprise the Open Mobile Alliance (OMA) device management (DM) protocol. The first server and second server may be the same server, and the wireless communication network may comprise one of the following: a cellular network, a paging network, a wireless wide area network, and a wireless local area network.

Yet other aspects of the present invention may be found in an electronic device supporting remote terminal management. Such a device may comprise communication circuitry that enables wireless communication with at least one remote server via a wireless network, at least one memory containing machine readable code executable by a processor, and at least one processor operably coupled to the communication circuitry and the at least one memory. The machine readable code may enable access to a plurality of management objects in the electronic device in accordance with an Open Mobile Alliance (OMA) device management (DM) protocol, and the electronic device may respond to a terminal management activity invoked via the plurality of management objects, by executing an associated management task.

In various representative embodiments of the present invention, the terminal management activity may comprise one of the following: a factory reset, a reboot, a device lock, a device unlock, a device wipe, a device backup, and a device restore activity. The terminal management activity may also comprise reporting device status information, returning results of the executed management task, and returning results of a prior management task. In some representative embodiments of the present invention, at least one of the following: a frequency and a format of returned results, may be configurable.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An electronic device supporting remote terminal management, the device comprising:
    communication circuitry that enables wireless communication with at least one remote server via a wireless network;
    at least one memory containing machine readable code executable by a processor;
    at least one processor operably coupled to the communication circuitry and the at least one memory;
    wherein the machine readable code enables the electronic device to receive a device management command identifying a management object and value from a remote server;
    wherein the machine readable code is configured to parse the device management command to determine whether the command identifies the management object as a terminal management extension of an Open Mobile Alliance (OMA) device management (DM) protocol;
    wherein the machine readable code enables access to a first plurality of management objects in accordance with the OMA DM protocol when parsing the management command determines the command does not identify the management object as the terminal management extension;
    wherein the machine readable code also enables access to a second plurality of management objects not explicitly defined within the OMA DM protocol when parsing the management command determines the command does identify the management object as the terminal management extension;
    wherein access to a management object in the second plurality of management objects invokes an associated electronic device control action; and
    wherein the control actions associated with the second plurality of management objects comprise one of the following: an action to reset the electronic device, an action to lock the electronic device, an action to unlock the electronic device, an action to delete a firmware or software application from the electronic device, and an action to wipe memory of the electronic device.

2. The electronic device according to claim 1, wherein the wireless network comprises one of the following: a cellular telephone network, a wireless wide area network, a wireless local area network, and a paging network.

3. The electronic device according to claim 1, wherein the at least one memory comprises non-volatile memory, and wherein at least a portion of a device profile is stored in the non-volatile memory.

4. The electronic device according to claim 3, wherein the non-volatile memory comprises flash-type memory.

5. The electronic device according to claim 1, wherein the machine readable code enables collection of one or more quality of service parameters related to operation of the electronic device.

6. The electronic device according to claim 1, wherein the control actions associated with the second plurality of management objects comprise reporting device status information.

7. The electronic device according to claim 1, wherein the control actions associated with the second plurality of management objects comprise executing an associated management task and returning results thereof.

8. The electronic device according to claim 1, wherein the control actions associated with the second plurality of management objects comprise returning results of a prior control action.

9. The electronic device according to claim 1, wherein at least one of the following: a frequency and a format of returned results, is configurable.

10. The electronic device according to claim 1, wherein the electronic device comprises one of the following: a cellular telephone, a pager, a personal digital assistant, and a personal computer.

11. The electronic device according to claim 1, wherein access to a management object comprises one of the following: retrieving a value of the management object, deleting the management object, creating the management object, and modifying a value of the management object.

12. The electronic device according to claim 1, wherein at least a portion of the second plurality of management objects adds information about the electronic device by incorporating additional management objects in the OMA DM ./DevInfo and ./DevDetail management objects.

13. The electronic device according to claim 12, wherein the additional management objects comprise information about at least one of the following: an original equipment manufacturer, a software or firmware platform, a processor, a battery level, a power source, and a memory.

14. An electronic device supporting remote terminal management, the device comprising:
    communication circuitry that enables wireless communication with at least one remote server via a wireless network;
    at least one memory containing machine readable code executable by a processor;
    at least one processor operably coupled to the communication circuitry and the at least one memory;
    wherein the machine readable code enables the electronic device to receive a device management command identifying a management object and value from a remote server;
    wherein the machine readable code is configured to parse the device management command to determine whether the command identifies the management object as a terminal management extension of an Open Mobile Alliance (OMA) device management (DM) protocol;
    wherein the machine readable code enables access to a first plurality of management objects in the electronic device in accordance with the OMA DM protocol when parsing the management command determines the command does not identify the management object as the terminal management extension;
    wherein the machine readable code also enables access to a second plurality of management objects not explicitly defined within the OMA DM protocol when parsing the management command determines the command does identify the management object as the terminal management extension;
    wherein the electronic device responds to a terminal management activity invoked via the plurality of management objects, by executing an associated management task; and
    wherein the terminal management activity and associated management task invoked by the second plurality of management objects comprise one of the following: a factory reset, a device lock, a device unlock, a device wipe to ensure that the electronic device does not represent a threat to enterprise intellectual property.

15. The electronic device according to claim 14, wherein the terminal management activity and associated management task invoked by the first plurality of management objects comprises one of the following: a reboot, a device backup, and a device restore activity.

16. The electronic device according to claim 14, wherein the terminal management activity comprises reporting device status information.

17. The electronic device according to claim 14, wherein the terminal management activity comprises returning results of the executed management task.

18. The electronic device according to claim 14, wherein the terminal management activity comprises returning results of a prior management task.

19. The electronic device according to claim 14, wherein at least one of the following: a frequency and a format of returned results, is configurable.

* * * * *